United States Patent
Jons et al.

(10) Patent No.: US 8,661,648 B2
(45) Date of Patent: Mar. 4, 2014

(54) SPIRAL WOUND FILTRATION MODULE

(75) Inventors: Steven D. Jons, Eden Prairie, MN (US); Allyn R. Marsh, III, Lakeville, MN (US)

(73) Assignee: Dow Global Technologies LLC, Midland, MI (US)

( * ) Notice: Subject to any disclaimer, the term of this patent is extended or adjusted under 35 U.S.C. 154(b) by 368 days.

(21) Appl. No.: 13/032,663

(22) Filed: Feb. 23, 2011

(65) Prior Publication Data

US 2011/0232061 A1 Sep. 29, 2011

Related U.S. Application Data

(60) Provisional application No. 61/316,949, filed on Mar. 24, 2010.

(51) Int. Cl.
*B23P 25/00* (2006.01)
(52) U.S. Cl.
USPC ............... 29/458; 210/321.83; 210/321.85; 210/321.72; 210/321.76; 210/321.74; 96/6; 96/8
(58) Field of Classification Search
USPC ............ 29/458; 210/321.72, 321.74, 321.76, 210/321.83, 321.85; 96/4, 6, 8, 10, 11
See application file for complete search history.

(56) References Cited

U.S. PATENT DOCUMENTS

| | | | |
|---|---|---|---|
| 3,386,583 A * | 6/1968 | Merten .................... 210/321.83 |
| 4,214,994 A * | 7/1980 | Kitano et al. ................ 210/490 |
| 4,277,344 A * | 7/1981 | Cadotte ......................... 210/654 |
| 4,765,897 A * | 8/1988 | Cadotte et al. ........... 210/500.23 |
| 4,795,559 A * | 1/1989 | Shinjou et al. ................ 210/490 |
| 4,842,736 A * | 6/1989 | Bray et al. ................ 210/321.61 |
| 4,960,518 A * | 10/1990 | Cadotte et al. ................ 210/639 |
| 4,964,998 A * | 10/1990 | Cadotte et al. ................ 210/654 |
| 5,034,126 A * | 7/1991 | Reddy et al. ............. 210/321.74 |
| 5,079,168 A * | 1/1992 | Amiot ......................... 435/297.2 |
| 5,096,584 A * | 3/1992 | Reddy et al. ............. 210/321.74 |
| 5,108,604 A * | 4/1992 | Robbins .................... 210/321.74 |
| 5,114,582 A * | 5/1992 | Sandstrom et al. ...... 210/321.74 |
| 5,147,541 A * | 9/1992 | McDermott et al. ..... 210/321.74 |
| 5,275,726 A * | 1/1994 | Feimer et al. ............ 210/321.74 |

(Continued)

FOREIGN PATENT DOCUMENTS

| JP | 4201433 | 6/1999 |
|---|---|---|
| JP | 2009131840 | 6/2009 |
| WO | 2004000445 | 12/2003 |
| WO | 2007067751 | 5/2007 |

OTHER PUBLICATIONS

Chirrick et al.; Development of Large Spiral Membrane Reverse Osmosis Elements for Low Cost Water Purification and Reclamation; Nov. 1973; United States Department of Interior; INT-OSW-RDPR-73-901; pp. 1-122.*

(Continued)

*Primary Examiner* — Jermie Cozart
*Assistant Examiner* — Bayan Salone
(74) *Attorney, Agent, or Firm* — Edward W. Black

(57) ABSTRACT

The present invention is directed toward spiral wound modules along with methods for making and using the same. Several embodiments are described including methods for making spiral wound filtration modules using membrane sheet provided from a roll, wherein the membrane sheet is unrolled and assembled in a direction parallel to the permeate collection tube of the module.

4 Claims, 5 Drawing Sheets

(56) References Cited

U.S. PATENT DOCUMENTS

| | | | |
|---|---|---|---|
| 5,435,957 A * | 7/1995 | Degen et al. | 264/162 |
| 5,536,405 A * | 7/1996 | Myrna et al. | 210/321.75 |
| 5,538,642 A * | 7/1996 | Solie | 210/652 |
| 5,580,452 A * | 12/1996 | Lin | 210/321.74 |
| 5,658,460 A * | 8/1997 | Cadotte et al. | 210/500.38 |
| 5,681,467 A * | 10/1997 | Solie et al. | 210/486 |
| 5,858,229 A * | 1/1999 | Uemura et al. | 210/321.75 |
| 5,876,602 A * | 3/1999 | Jons et al. | 210/500.38 |
| 5,919,026 A * | 7/1999 | Appleton | 414/408 |
| 6,066,254 A * | 5/2000 | Huschke et al. | 210/282 |
| 6,068,771 A * | 5/2000 | McDermott et al. | 210/321.83 |
| 6,156,680 A * | 12/2000 | Goettmann | 442/344 |
| 6,255,359 B1 * | 7/2001 | Agrawal et al. | 521/64 |
| 6,277,282 B1 * | 8/2001 | Kihara et al. | 210/652 |
| 6,280,853 B1 * | 8/2001 | Mickols | 428/474.4 |
| 6,299,772 B1 * | 10/2001 | Huschke et al. | 210/282 |
| 6,337,018 B1 * | 1/2002 | Mickols | 210/500.38 |
| 6,352,641 B1 * | 3/2002 | Schmidt | 210/321.83 |
| 6,632,356 B2 * | 10/2003 | Hallan et al. | 210/321.6 |
| 6,855,743 B1 * | 2/2005 | Gvozdic | 521/141 |
| 6,878,278 B2 * | 4/2005 | Mickols | 210/500.38 |
| 6,881,336 B2 * | 4/2005 | Johnson | 210/321.76 |
| 7,048,855 B2 * | 5/2006 | de la Cruz | 210/321.74 |
| 7,303,675 B2 * | 12/2007 | De La Cruz | 210/321.76 |
| 7,335,301 B2 * | 2/2008 | Cheng | 210/321.85 |
| 7,393,388 B2 * | 7/2008 | Spadaccini et al. | 96/6 |
| 7,815,987 B2 * | 10/2010 | Mickols et al. | 428/36.5 |
| 7,875,177 B2 * | 1/2011 | Haynes et al. | 210/321.85 |
| 7,882,963 B2 * | 2/2011 | Mickols et al. | 210/500.38 |
| 7,905,361 B2 * | 3/2011 | Niu et al. | 210/500.38 |
| 8,110,016 B2 * | 2/2012 | McCollam | 55/502 |
| 8,142,588 B2 * | 3/2012 | McCollam | 156/187 |
| 8,210,042 B2 * | 7/2012 | Mickols et al. | 73/587 |
| 8,388,848 B2 * | 3/2013 | Odaka et al. | 210/652 |
| 8,496,825 B1 * | 7/2013 | Jons et al. | 210/321.83 |
| 2003/0034293 A1 * | 2/2003 | Simonetti | 210/321.74 |
| 2004/0124134 A1 * | 7/2004 | Irie et al. | 210/321.85 |
| 2005/0077229 A1 * | 4/2005 | Ishii | 210/321.83 |
| 2005/0121380 A1 * | 6/2005 | De La Cruz | 210/321.83 |
| 2006/0219635 A1 * | 10/2006 | McCague et al. | 210/651 |
| 2007/0068864 A1 * | 3/2007 | Cruz et al. | 210/321.76 |
| 2007/0251883 A1 * | 11/2007 | Niu | 210/653 |
| 2007/0272628 A1 | 11/2007 | Mickols et al. | |
| 2008/0185332 A1 * | 8/2008 | Niu et al. | 210/500.38 |
| 2008/0202242 A1 * | 8/2008 | Mickols et al. | 73/587 |
| 2008/0295951 A1 * | 12/2008 | Hiro et al. | 156/185 |
| 2009/0159527 A1 * | 6/2009 | Mickols et al. | 210/500.38 |
| 2009/0272692 A1 * | 11/2009 | Kurth et al. | 210/652 |
| 2010/0006504 A1 * | 1/2010 | Odaka et al. | 210/651 |
| 2010/0147761 A1 * | 6/2010 | McCollam | 210/450 |
| 2010/0193428 A1 * | 8/2010 | Hane et al. | 210/489 |
| 2013/0026090 A1 * | 1/2013 | Johnson et al. | 210/435 |

OTHER PUBLICATIONS

Antrim et al. Worlds largest sprial element-histroy and development, Desalination 178 (2005) 313-324.

Chirrick et al. development of Large Spiral Membrane Reverse osmosis Elements for Low-cost water Purification and reclamation, Research and Development Report No. 901, Nov. 1973.

Dow case 67899 (U.S. Appl. No. 12/903,245, filed Oct. 13, 2010, McCollam, Robert P.).

Dow case 69712 ( U.S. Appl. No. 61/406,597, filed Oct. 26, 2010, Jons et al.).

* cited by examiner

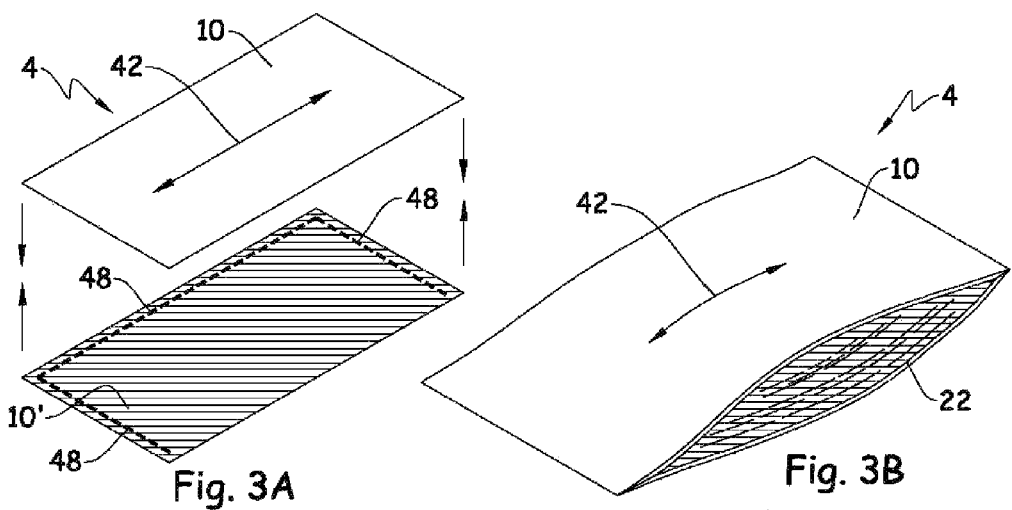
Fig. 3A
Fig. 3B
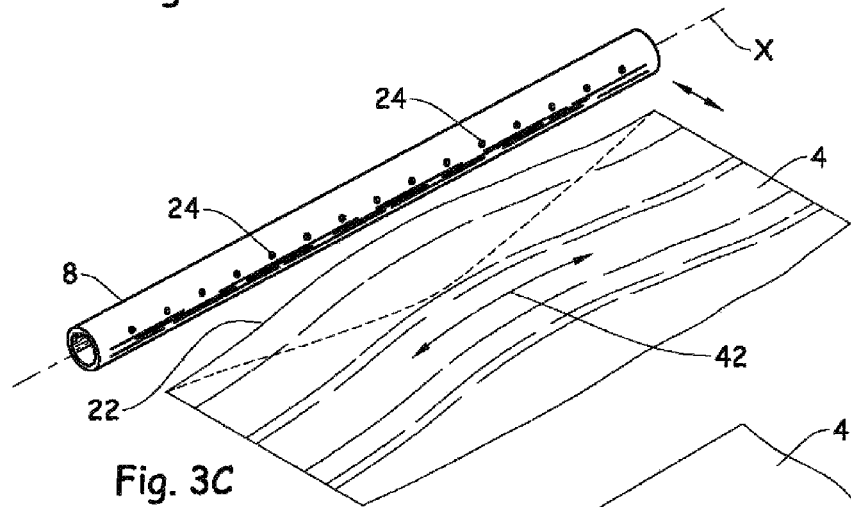
Fig. 3C
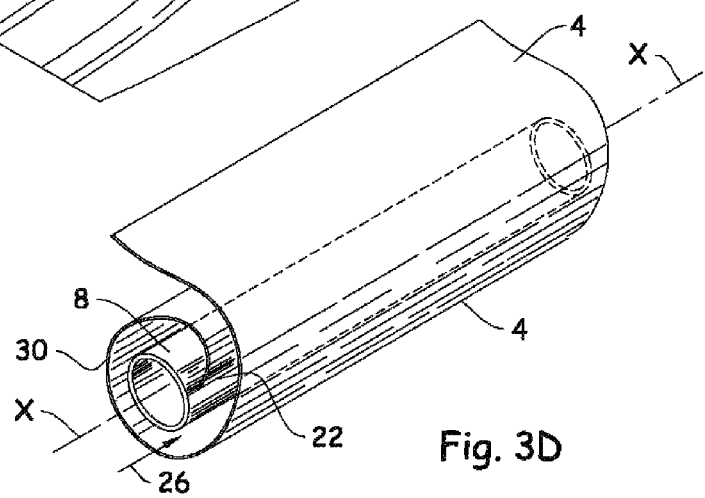
Fig. 3D

SPIRAL WOUND FILTRATION MODULE

CROSS REFERENCE STATEMENT

This application claims the benefit of U.S. Provisional Application No. 61/316,949, filed Mar. 24, 2010, the entire content of which is incorporated herein by reference.

FIELD OF THE INVENTION

The present invention is directed toward spiral wound filtration modules along with methods for making and using the same. The subject modules include at least one semi-permeable membrane for filtering fluids.

DESCRIPTION OF THE RELATED ART

Spiral wound filtration modules (also referred to as spiral wound "elements") are well known for use in a variety of fluid separations. Spiral wound modules typically include one or more membrane envelopes concentrically wound about a permeate collection tube. An individual membrane envelope is commonly fabricated from one or more individual membrane sheets, each comprising a semi-permeable membrane layer which is coated, cast or otherwise applied upon a support layer (e.g. non-woven fabric or web backing). Modules are assembled by aligning an open edge of the membrane envelope in fluid communication with the permeate collection tube and concentrically winding the envelope about the permeate collection tube. Depending upon the specific membrane used, spiral wound modules can be used in a wide variety of gas and liquid separations including for example: reverse osmosis (RO), nanofiltration (NF), ultrafiltration (UF) and microfiltration (MF) applications. Representative examples of spiral wound filtration modules and corresponding fabrication techniques are provided in: U.S. Pat. No. 5,096,584; U.S. Pat. No. 5,114,582; U.S. Pat. No. 5,147,541; U.S. Pat. No. 5,538,642; U.S. Pat. No. 5,681,467; U.S. Pat. No. 6,277,282; U.S. Pat. No. 6,881,336; US 2007/0272628; US 2008/0295951 and WO 2007/067751.

For most applications, spiral wound filtration modules are only available in a few standard sizes. For example, most RO and NF type spiral modules have a length (measured along the axis from the ends of the permeate collection tube) of approximately 1 meter or some fraction thereof (e.g. 660 mm, 300 mm, etc.). The standardization of module lengths is at least partially due to the roll widths of various sheet materials used in module fabrication. For example, permeate spacer sheets, feed spacer sheets and membrane support layers are commonly provided in 1 meter wide rolls. B. Antrim, et al., Desalination 178 (2005) 313-324 describes spiral modules having lengths up to about 1.5 meters but notes that longer modules would be a problem from a material supply standpoint. Even if available, wider rolls of sheet material present significant sheet handling challenges. As a consequence, lengths of spiral wound filtration modules have been limited to about 1.5 meters, but more commonly about 1 meter or less.

BRIEF SUMMARY OF THE INVENTION

The present invention is directed toward spiral wound modules and methods for making and using the same. In one embodiment, the invention comprises a method for making a spiral wound module comprising: providing a permeate collection tube and at least one roll of membrane sheet wherein the membrane sheet comprises a membrane layer and support layer which are rolled up in a roll direction; removing a first and second rectangular section of membrane sheet from at least one roll, wherein each section has four edges and two opposing sides including a membrane side and a support side; forming a membrane envelope by overlaying the first section of membrane sheet upon the second section such that the roll direction of both sections are parallel to each other, aligning the edges of both sections of membrane sheet with each other, and sealing both sections of membrane sheet together along three of the aligned edges such that an unsealed fourth edge is parallel to the roll direction of both sections and defines a proximal edge; and winding the membrane envelope concentrically about the permeate collection tube such that the proximal edge of the membrane envelope is in a proximal position along the permeate collection tube. Many additional embodiments are described.

An advantage of at least one embodiment of the invention is that spiral wound filtration modules can be made with lengths that are not limited by the roll width of a support layer used to prepare a membrane sheet. Another advantage of at least one embodiment is that relatively long (e.g. greater than 1 meter, 1.75 meters, 2.75 meters, 3.75 meters, 4.75 meters or even 5.75 meters) modules can be fabricated using conventional support materials provided from rolls having conventional widths, e.g. about a meter or less. As compared with shorter modules, longer modules have more active membrane area due to fewer glue lines associated with forming membrane envelopes, i.e. a module having a length of 2 meters has more effective membrane surface area than two comparable modules having lengths of 1 meter each.

BRIEF DESCRIPTION OF THE DRAWINGS

FIG. 3A is a perspective view showing one embodiment of a partially assembled membrane envelope.

FIG. 3B is a perspective view of an assembled membrane envelope.

FIG. 3C is a perspective view of a partially assembled spiral wound module including the membrane envelope of FIG. 3B.

FIG. 3D is a perspective view of the partially assembled spiral wound module of FIG. 3C taken at a subsequent point of assembly.

DETAILED DESCRIPTION OF THE INVENTION

The present invention includes a spiral wound filtration module along with methods for making and using the same. The configuration of the spiral wound module is not particularly limited and those described in the references cited in the Related Art section are all suitable. In general, the module preferably includes at least one membrane envelope concentrically wound about a permeate collection tube. The membrane envelope is preferably formed from one or more membrane sheets which are sealed about a portion of their periphery. An edge of the membrane envelope is aligned axially along a permeate collection tube such the membrane envelope is in fluid communication with the permeate collection tube but is otherwise sealed from feed fluid passing across the outer surface of the membrane envelope.

Figure 1:
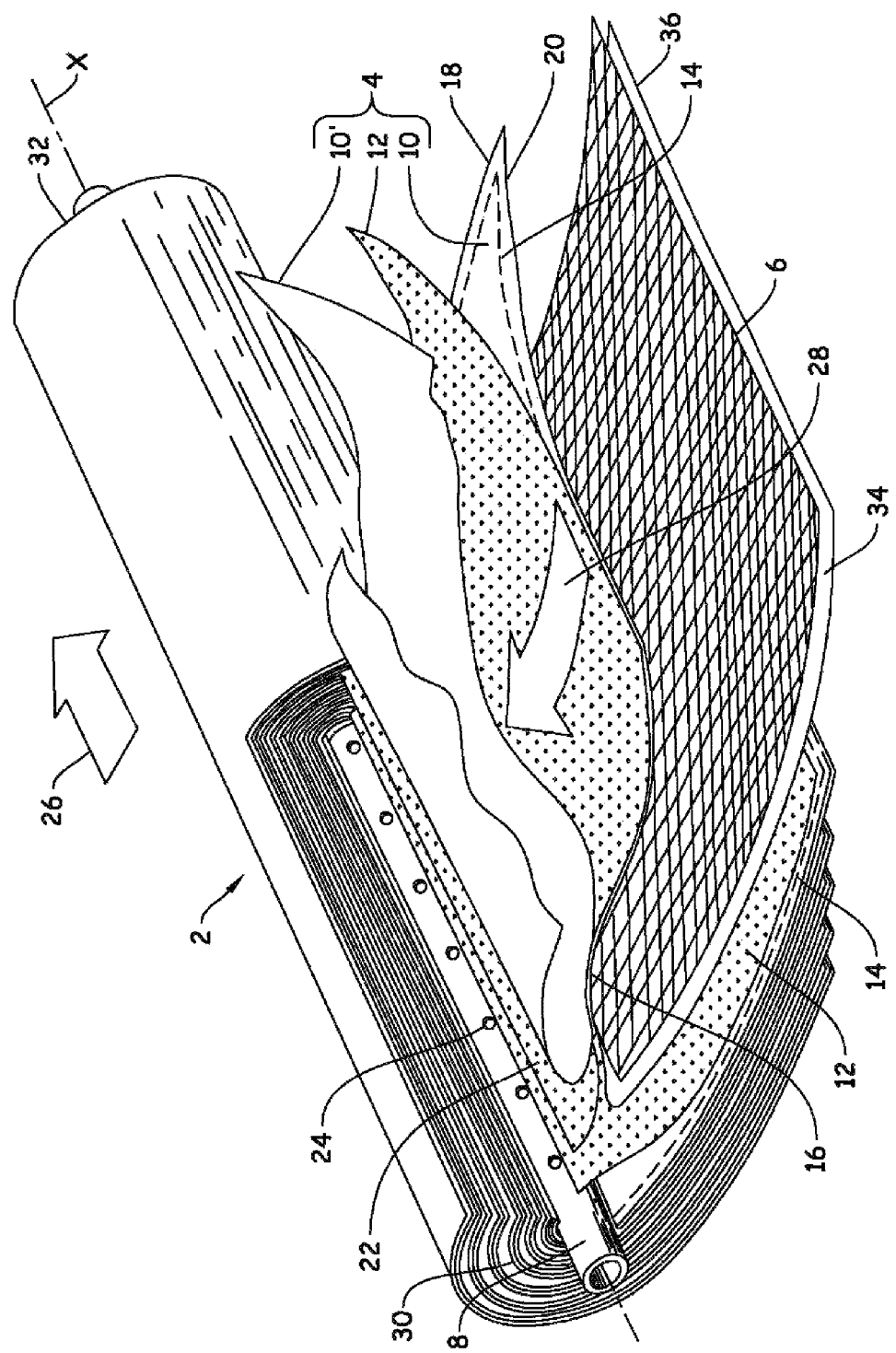
FIG. 1 is a perspective, partially cut-away view of a spiral wound filtration module.

A preferred embodiment of a spiral wound filtration module is generally shown at 2 in FIG. 1. The module (2) is formed by concentrically winding one or more membrane envelopes (4) and optional feed channel spacer sheet(s) ("feed spacers") (6) about a permeate collection tube (8). Each membrane envelope (4) preferably comprises two substantially rectangular sections of membrane sheet (10, 10'). Each section of membrane sheet (10, 10') has a membrane or front side (34) and support or back side (36). The membrane envelope (4) is formed by overlaying membrane sheets (10, 10') and aligning their edges. In a preferred embodiment, the sections (10, 10') of membrane sheet surround a permeate channel spacer sheet ("permeate spacer") (12). This sandwich-type structure is secured together, e.g. by sealant (14), along three edges (16, 18, 20) to form an envelope (4) while a fourth edge, i.e. "proximal edge" (22) abuts the permeate collection tube (8) so that the inside portion of the envelope (4) (and optional permeate spacer (12)) is in fluid communication with a plurality of openings (24) extending along the length of the permeate collection tube (8). The module (2) preferably comprises a plurality of membrane envelopes (4) separated by a plurality of feed spacers sheets (6). In the illustrated embodiment, membrane envelopes (4) are formed by joining the back side (36) surfaces of adjacently positioned "membrane leaf packets." In one preferred embodiment described in connection with FIGS. 4A-4B, a membrane leaf packet comprises a substantially rectangular membrane sheet (10) folded upon itself to define two membrane "leaves" wherein the front sides (34) of each leaf are facing each other and the fold is axially aligned with the proximal edge (22) of the membrane envelope (4), i.e. parallel with the permeate collection tube (8). A feed spacer sheet (6) is shown located between facing front sides (34) of the folded membrane sheet (10). The feed spacer sheet (6) facilitates flow of feed fluid in an axial direction (i.e. parallel with the permeate collection tube (8)) through the module (2). While not shown, additional intermediate layers may also be included in the assembly. Representative examples of membrane leaf packets and their fabrication are further described in: U.S. Pat. No. 4,842,736; U.S. Pat. No. 5,147,541 and U.S. Ser. No. 12/330,975 to Haynes et al.

During module fabrication, permeate spacer sheets (12) may be attached about the circumference of the permeate collection tube (8) with membrane leaf packets interleaved therebetween. The back sides (36) of adjacently positioned membrane leaves (10, 10') are sealed about portions of their periphery (16, 18, 20) to enclose the permeate spacer sheet (12) to form a membrane envelope (4). The membrane envelope(s) (4) and feed spacer(s) (6) are wound or "rolled" concentrically about the permeate collection tube (8) to form two opposing scroll faces (30, 32) at opposing ends and the resulting spiral bundle is held in place, such as by tape or other means. The sealant (14) used for sealing the edges (16, 18, 20) of the membrane envelope (4) preferably permits relative movement of the various sheet materials during the winding process. That is, the cure rate or period of time before which the sealant (14) becomes tacky is preferably longer than that required to assemble and wind the membrane envelopes (4) about the permeate collection tube (8).

Arrows shown in FIG. 1 represent the approximate flow directions (26, 28) of feed and permeate fluid during operation. Feed fluid enters the module (2) from an inlet scroll face (30) and flows across the front side(s) (34) of the membrane sheet(s) and exits the module (2) at the opposing outlet scroll face (32). Permeate fluid flows along the permeate spacer sheet (12) in a direction approximately perpendicular to the feed flow as indicated by arrow (28). Actual fluid flow paths vary with details of construction and operating conditions.

Materials for constructing various components of spiral wound modules are well known in the art. Suitable sealants for sealing membrane envelopes include urethanes, epoxies, silicones, acrylates, hot melt adhesives and UV curable adhesives. While less common, other sealing means may also be used such as application of heat, pressure, ultrasonic welding and tape. Permeate collection tubes are typically made from plastic materials such as acrylonitrile-butadiene-styrene, polyvinyl chloride, polysulfone, poly (phenylene oxide), polystyrene, polypropylene, polyethylene or the like. Tricot polyester materials are commonly used as permeate spacers. Additional permeate spacers are described in US 2010/0006504. Representative feed spacers include polyethylene, polyester, and polypropylene mesh materials such as those commercially available under the trade name VEXAR™ from Conwed Plastics. Additional feed spacers are described in U.S. Pat. No. 6,881,336 to Johnson.

The selection of membrane sheet is typically based on the specific application, feed source, solute, and foulant. In a preferred embodiment, the membrane sheet comprises at least one membrane layer (front side) and a support layer (back side). The membrane sheet is preferably a multi-laminate structure comprising a plurality of layers in planer arrangement with each other. The membrane layer is not particularly limited and a wide variety of materials may be used, e.g. cellulose acetate materials, polysulfone, polyether sulfone, polyamides, polyvinylidene fluoride, etc. Similarly, the support layer is not particularly limited but preferably comprises a non-woven fabric or fibrous web mat including fibers which may be orientated. Alternatively, a woven fabric such as sail cloth may be used. Representative examples of support layers are described in U.S. Pat. No. 4,214,994; U.S. Pat. No. 4,795,559; U.S. Pat. No. 5,435,957; U.S. Pat. No. 5,919,026; U.S. Pat. No. 6,156,680; US 2008/0295951 and U.S. Pat. No. 7,048,855 which describes a membrane sheet including an integrated permeate spacer. In preferred embodiments, the support layer is provided as a roll of sheet material upon which a membrane layer is applied. The support layer preferably comprises non-woven fibers orientated in the roll direction such that the support layer has an elastic modulus in the roll direction (i.e. length direction) which is at least 1.5 times greater and more preferably at least 3 times greater than the elastic modulus in a direction perpendicular to the roll direction (i.e. width direction). Similarly, the membrane sheet formed with the support layer also preferably has a elastic modulus in the roll direction (i.e. length direction) which is at least 1.5 times greater and more preferably at least 3 times greater than the elastic modulus in a direction perpendicular to the roll direction (i.e. width direction). As used herein, the term "elastic modulus" refers to Young's modulus or tensile elasticity, i.e. the ratio of tensile stress to tensile strain, as measured by ASTM (D882-09). A support layer including fibers orientated in the roll direction provides a module with improved dimensional strength along the modules' length. This added strength can be particularly useful when making long modules, i.e. modules over 1 meter long. It will be understood by those skilled in the art that fibers of support layers extend along a variety of directions and that term "orientated" is intended to refer to a relative value, i.e. a dominate alignment direction of fibers, rather than an absolute value.

For RO and NF applications, a preferred membrane sheet comprises a thin film polyamide composite membrane sheet including a multi-layer structure, e.g. a support layer, a middle layer of microporous polymer and thin film membrane layer. The support layer preferably comprises a nonwoven fabric such as polyester fiber fabric available from Awa Paper Company. A middle layer of microporous polymer, e.g. polysulfone, is cast upon the support layer and preferably has a thickness of about 25-125 microns. The thin film membrane layer (front side) preferably comprises a thin film polyamide layer having a thickness less than about 1 micron and more preferably from about 0.010 to 0.1 micron. The polyamide layer is preferably formed by an interfacial polycondensation reaction between a polyfunctional amine monomer and a polyfunctional acyl halide monomer upon the surface of the microporous polymer layer, as described in U.S. Pat. No. 4,277,344 and U.S. Pat. No. 5,658,460 to Cadotte et al; U.S. Pat. No. 6,878,278; U.S. Pat. No. 6,280,853; US 2009/0159527 and U.S. Ser. No. 12/328,241 to Mickols, and US 2007/0251883 and US 2008/0185332 to Niu et al.

During module fabrication, long glass fibers may be wound about the partially constructed module and resin (e.g. liquid epoxy) applied and hardened. In an alternative embodiment, tape may be applied upon the circumference of the wound module. The ends of modules are often fitted with an antitelescoping device or end cap (not shown) designed to prevent membrane envelopes from shifting under the pressure differential between the inlet and outlet scroll ends of the module. The end cap is commonly fitted with an elastomeric seal (not shown) to form a tight fluid connection between the module and a pressure vessel (not shown). Examples of end cap designs include those described in U.S. Pat. No. 6,632,356 to Hallan, et al., along with FilmTec Corporation's iLEC™ interlocking end caps. The outer housing of a module may include fluid seals to provide a seal within the pressure vessel as described in U.S. Pat. Nos. 6,299,772 and 6,066,254 to Huschke et al. and U.S. Ser. No. 12/332,464 to McCollam. Additional details regarding various components and construction of spiral wound modules are provided in the literature see for example: U.S. Pat. No. 5,538,642 to Solie which describes a technique for attaching the permeate spacer to the permeate collection tube, WO 2007/067751 to Jons et. al which describes trimming operations and the use of a UV adhesive for forming an insertion point seal and U.S. Pat. No. 5,096,584 to Reddy et al. which describes various embodiments, components and construction techniques particularly suited for gas separations.

Figure 2A:
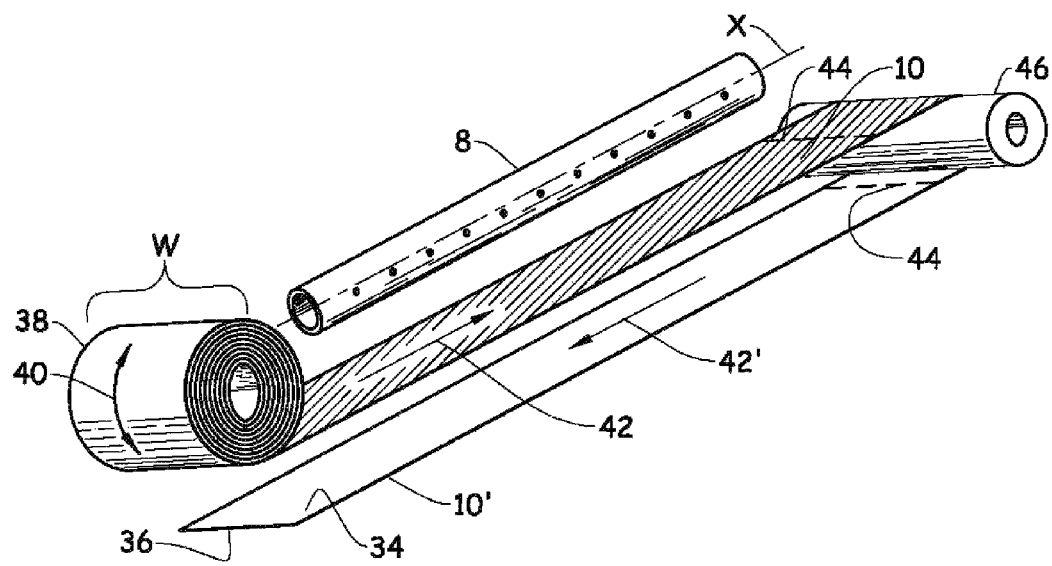
FIG. 2A is a perspective view of an idealized set-up for practicing one embodiment of the invention showing a roll of membrane sheet being unrolled along a roll direction parallel to an axis (X) of an adjacently positioned permeate collection tube.

FIG. 2A is a perspective view of an idealized set-up for practicing several embodiments of the invention. During fabrication of a spiral wound module, first and second sections (10, 10') of membrane sheet are removed from a common roll (38) having a width (W) and assembled into a membrane envelope or membrane leaf packet (not shown). The manner in which the sections (10, 10') are removed from the roll (38) is not particularly limited but preferably comprises unrolling (depicted by curved bi-direction arrow (40)) membrane sheet from the roll (38) along a roll direction (42, 42') and detaching, e.g. cutting (as depicted by dotted lines (44)) rectangular sections of membrane sheet from the roll (38). Once removed from the roll (38) the rectangular sections (10, 10') have a width corresponding to the width of the roll (38) and a length that preferably corresponds to the length of permeate collection tube (8), (e.g. the length of the sections need not be the exactly the same as the tube (8) as excess sheet can be subsequently trimmed away). The length of the sections (10, 10') is preferably at least twice as large as the width, but more preferably at least 2.5, 3, 5, 7, 10 or in some embodiments at least 15 times as large. As will be subsequently described, modules made pursuant to embodiments of the present invention may have lengths over 1 meter long and in some embodiments, lengths at least 1.75 meters, 2.75 meters, 3.75 meters, 4.75 meters and even 5.75 meters long. The aspect ratio of a spiral wound module of this invention, defined as its distance between scroll faces divided by its largest diameter, may be greater than 17, 20, or even 24.

As will be described in connection with other Figures, a membrane envelope or membrane leaf packets can be formed by overlapping and aligned rectangular sections of membrane sheet. In the idealized set-up of FIG. 2A, sections (10, 10') of membrane sheet are provided in an overlapping orientation by unrolling the membrane sheet from a common roll (38) and reversing the roll direction by way of a roller (46). In the idealized set-up of FIG. 2A, the membrane sheet is unrolled along a roll direction (42, 42') which is parallel and adjacently aligned with an axis (X) defined by the permeate collection tube (8). While this alignment is preferred, it is not required. That is, membrane leaf packets or membrane envelopes may be prepared at a remote location and subsequently be aligned with a permeate collection tube (8) during module assembly. However, in either embodiment the roll direction (42, 42') of each section (10, 10') of membrane sheet is preferably parallel with the axis (X) defined by the permeate collection tube (8).

Figure 2B:
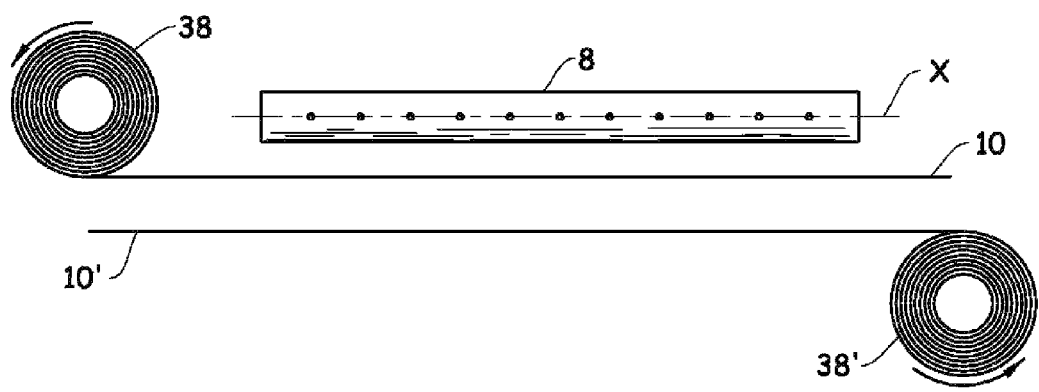
FIG. 2B is an elevational view of an idealized set-up for practicing another embodiment of the invention showing two rolls of membrane sheet being unrolled along roll directions parallel to an axis (X) of an adjacently positioned permeate collection tube.

FIG. 2B illustrates another idealized set-up for practicing an embodiment of the invention using two separate membrane rolls (38, 38'), both shown with partially unrolled sections of membrane sheet with opposing roll directions extending along a path parallel to the axis (X) of an adjacently positioned permeate collection tube (8). As with the embodiment of FIG. 2A, the illustrated set-up provides membrane sheets (10, 10') in an overlapping orientation which is adjacently aligned with the permeate collection tube (8). While shown at opposite ends of the permeate collection tube (8), the membrane rolls (38, 38') may also be positioned and unrolled from a common end.

The roll (38) upon which the membrane sheet is wound may be provided with either the membrane side (34) or support side (36) facing outward. In the embodiment of FIG. 2A, the membrane sheet is unrolled in a roll direction (42, 42') such that the support side (36) faces outward and the overlapping sections (10, 10') are orientated such that their membrane sides (34) are facing each other. As will be described in connection with FIGS. 4-5, this set-up is useful for making membrane leaf packets. Whereas, if the membrane sheet were reversed, (i.e. such that the support sides (36) of the overlapping sections (10, 10') are facing), the set-up is useful for making membrane envelopes as described in connection with FIGS. 3A-3B. Both approaches are applicable to the present invention.

FIGS. 3A-3D illustrate one embodiment of a membrane envelope and spiral wound module. Turning to FIG. 3A, a partially assembled membrane envelope is generally shown at 4 including a first and second rectangular section (10, 10') of membrane sheet. The membrane envelope (4) is formed by overlaying sections (10, 10') such that the roll directions (42) of both sheets (10, 10') are parallel. The edges of the sections (10, 10') are aligned and sealed together along three edges. The method for sealing the sections together is not particularly limited, (e.g. application of adhesive or sealant (48), application of tape, localized application of heat and pressure, etc.). Once sealed together as shown in FIG. 3B, the membrane envelope (4) includes an unsealed edge or "proximate edge" (22) which is parallel to the roll directions (42) of the sections (10, 10'). FIG. 3C shows the membrane envelope (4) in alignment along the permeate collection tube (8) such that the proximal edge (22) is parallel with the axis (X) and in a proximal position along the permeate collection tube (8). Once aligned, the proximal edge (22) is in fluid communication with the opening(s) (24) along the permeate collection tube (8) but is preferably sealed such that feed fluid flowing through the module (shown as arrow 26 in FIG. 1) is prevented from passing directly into the permeate collection tube (8). FIG. 3D shows the membrane envelope (4) being concentrically wound about the permeate collection tube (8). As described in connection with FIGS. 2A and 2B, the membrane envelope (4) may be formed at a remote location and subsequently be aligned along a permeate collection tube (as shown in FIG. 3C) during module assembly. Alternatively, the membrane envelope may be formed from membrane sheets which are already aligned with the permeate collection tube as illustrated in FIGS. 2A and 2B.

Figure 4A:
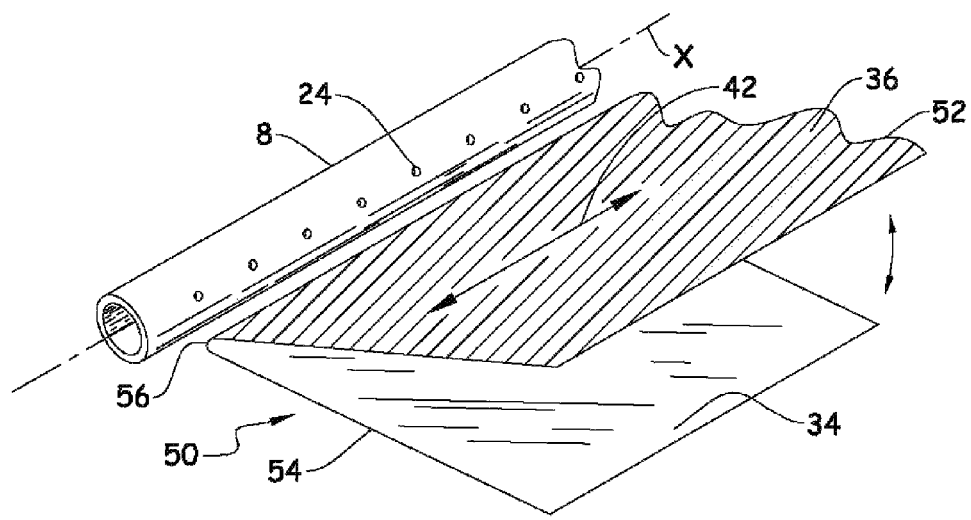
FIG. 4A is a perspective view (partially cut-away) of one embodiment of a membrane leaf packet.

FIG. 4A illustrates an embodiment of a partially assembled membrane leaf packet, generally shown at 50. The membrane leaf packet (50) has four edges and may be prepared by removing a rectangular section of membrane sheet from a roll (not shown). The section is then folded along an axis parallel with the roll direction (42) of the membrane sheet to form a first (52) and second (54) leaf extending from a fold (56). The section is folded such that the membrane sides (34) of the leaves (52, 54) face each other, preferably with their edges aligned (i.e. both leaf 52, 54 have approximately the same dimension).

Figure 4B:
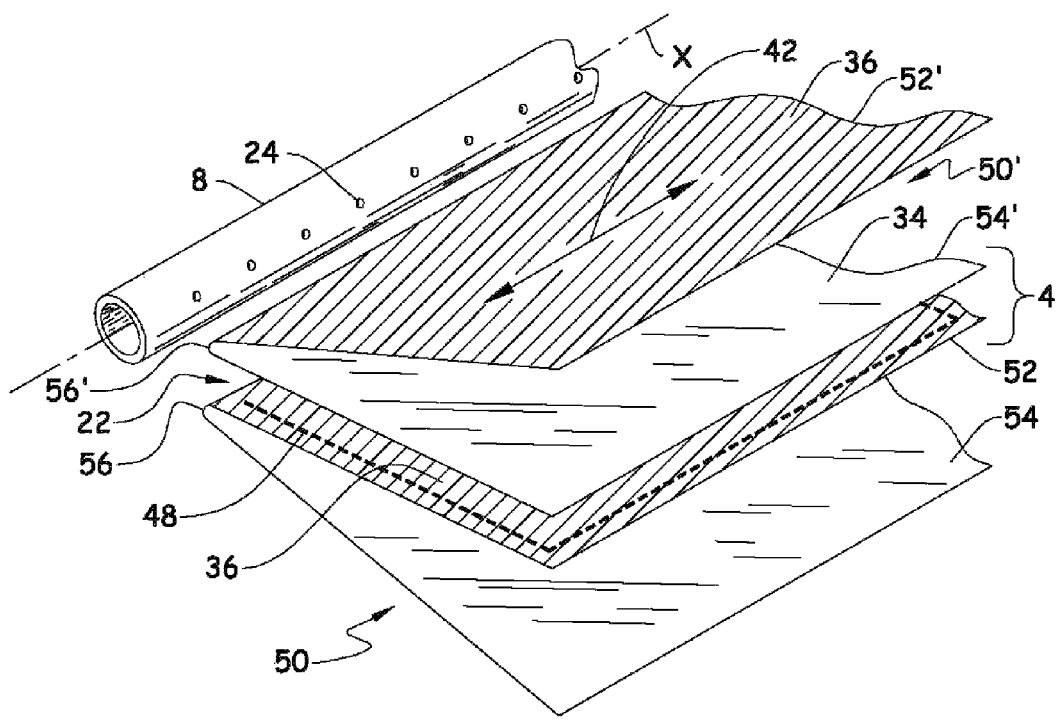
FIG. 4B is a perspective view (partially cut-away) of a partially assembled spiral wound module including two membrane leaf packets.

As shown in FIG. 4B, a membrane envelope (4) may be formed by overlaying a first membrane leaf packet (50') upon a second membrane leaf packet (50) such that the support side (not shown) of a membrane leaf (54') of the first membrane leaf packet (50') faces the support side (36) of a membrane leaf (52) of the second membrane leaf packet (50). The edges of the first and second membrane leaf packets (50, 50') are aligned such that the folds (56, 56') of each are aligned and parallel with each other. The facing membrane leaves (54', 52) are sealed together along three peripherally edges (48) such that an unsealed fourth edge defines a proximal edge (22) which is aligned and parallel to the folds (56, 56') of the first and second membrane leaf packets (50, 50'). As with the embodiments of FIG. 1 and FIGS. 3C-3D, the proximal edge (22) of the membrane envelope (22) is in fluid communication with the permeate collection tube via openings (24).

Figure 5A:
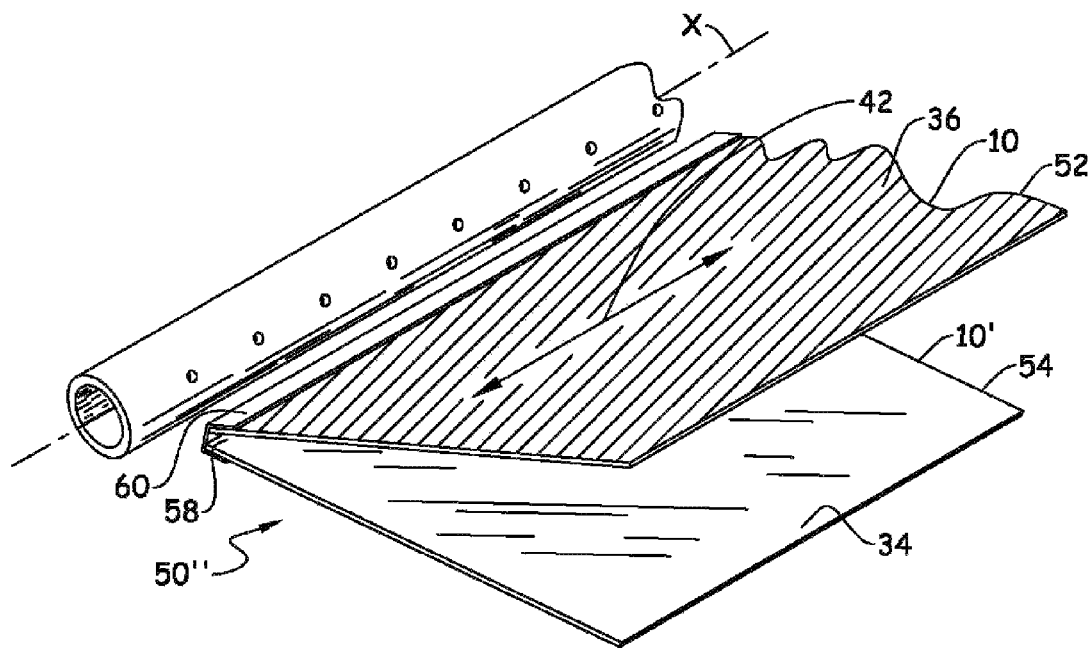
FIG. 5A is a perspective view (partially cut-away) of a partially assembled spiral wound module including an alternative embodiment of a membrane leaf packet.
Figure 5B:
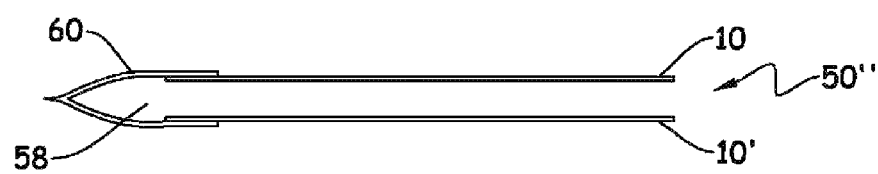
FIG. 5B is an elevation view of an alternative embodiment of a membrane leaf packet.
Figure 5C:
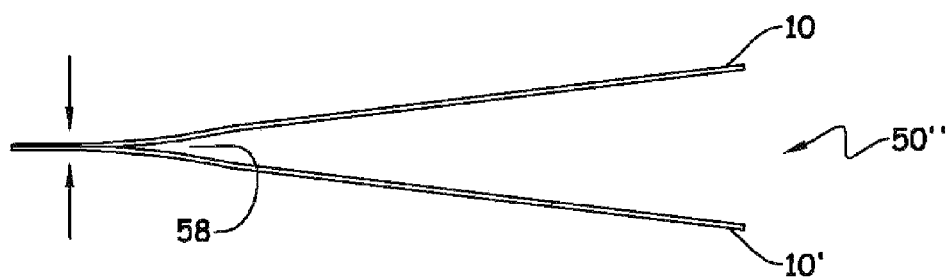
FIG. 5C is an elevation view of yet another embodiment of a membrane leaf packet.

FIG. 5A illustrates an alternative embodiment of a membrane leaf packet (50") comprising a first and second rectangular section (10, 10') of membrane sheet. The sections (10, 10') are removed from at least one roll (not shown). Each section (10, 10') has four edges and two opposing sides including a membrane side (34) and a support side (36). The membrane leaf packet (50") is formed by overlaying the first section (10) upon the second (10') such that the roll direction (42) of both sections (10, 10') are parallel to each other and the membrane side (34) of both sections (10, 10') are facing each other. The edges of the sections (10, 10') are aligned and both sections are sealed together along an aligned edge (58) which is parallel to the roll direction (42) of both sections (10, 10'), hereinafter referred to as a "sealed edge" (58). The means for sealing the sealed edge (58) are not limited. For example, in the embodiments of FIGS. 5A and 5B, tape (60) is disposed along the length of the sealed edge (58); whereas FIG. 5C illustrates an embodiment wherein heat and pressure (depicted by inward facing arrows) are applied to seal the sections (10, 10') together to form the sealed edge (58). While not shown, sealants such as adhesives may also be used to form the sealed edge (58). Membrane envelopes can be formed using the membrane leaf packets (50") of FIG. 5A in the same manner as described in connection with FIG. 4B.

As shown in FIG. 1, spiral wound modules of the present invention may optionally include one or more feed channel spacer sheets (6) and/or one or more permeate channel spacer sheets (12). During the fabrication of a spiral wound module, a feed channel spacer sheet may be positioned in planer alignment (i.e. overlaid) with a membrane envelope prior to winding the membrane envelope about the permeate collection tube. Similarly, a permeate channel spacer sheet may be positioned within the membrane envelope such that the permeate sheet extends from the proximal edge of the membrane envelope prior to winding the envelope about the permeate collection tube. While not shown, feed channel spacer sheets and permeate channel spacer sheets may be provided from rolls in a manner similar to that of the membrane sheet, as shown in FIGS. 2A and 2B. The use of aligned rolls of sheet materials facilitates the production of long modules, (e.g. longer than 1 meter and preferably at least 1.75 meters, 2.75 meters, 3.75 meters, 4.75 meters and even 5.75 meters long). The use of sheet materials having higher elastic modulus values in the length or roll direction as compared with the width direction (e.g. preferably 3× greater) further facilitates the production of such long modules due to increased dimensional strength along the modules' length.

While much of the detailed description of spiral wound modules has focused upon traditional RO and NF applications, those skilled in the art will readily appreciate the applicability to other spiral wound modules including but not limited to those directed toward UF, MF, electro-dialysis, electro-deionization along with modules designed for gas separation and non-aqueous liquid feeds.

Many embodiments of the invention have been described and in some instances certain embodiments, selections, ranges, constituents, or other features have been characterized as being "preferred". Such designations of "preferred" features should in no way be interpreted as an essential or critical aspect of the invention.

The entire content of each of the aforementioned patents and patent applications are incorporated herein by reference.

The invention claimed is:

1. A method for making a spiral wound module comprising:
providing a permeate collection tube;
providing at least one roll of membrane sheet wherein the membrane sheet comprises a membrane layer and support layer which are rolled up in a roll direction, wherein the support layer of the membrane sheet comprises a non-woven fabric comprising fibers orientated in the roll direction;
removing a first and second rectangular section of membrane sheet from at least one roll, wherein each section has four edges and two opposing sides including a membrane side and a support side;
forming a membrane envelope by:
overlaying the first section of membrane sheet upon the second section such that the roll direction of both sections are parallel to each other,
aligning the edges of both sections of membrane sheet with each other, and
sealing both sections of membrane sheet together along three of the aligned edges such that an unsealed fourth edge is parallel to the roll direction of both sections and defines a proximal edge; and
winding the membrane envelope concentrically about the permeate collection tube such that the proximal edge of the membrane envelope is in a proximal position along the permeate collection tube.

2. The method of claim 1 wherein each rectangular section of membrane sheet has an elastic modulus, and wherein the elastic modulus in the roll direction is at least 1.5 times greater than the elastic modulus in a direction perpendicular to the roll direction.

3. A method for making a spiral wound module comprising:
providing a permeate collection tube;
providing at least one roll of membrane sheet wherein the membrane sheet comprises a membrane layer and support layer which are rolled up in a roll direction;
removing a first and second rectangular section of membrane sheet from at least one roll, wherein each section has an elastic modulus, four edges and two opposing sides including a membrane side and a support side, and wherein the elastic modulus in the roll direction is at least 1.5 times greater than the elastic modulus in a direction perpendicular to the roll direction;
forming a membrane envelope by:
overlaying the first section of membrane sheet upon the second section such that the roll direction of both sections are parallel to each other,
aligning the edges of both sections of membrane sheet with each other, and
sealing both sections of membrane sheet together along three of the aligned edges such that an unsealed fourth edge is parallel to the roll direction of both sections and defines a proximal edge; and
winding the membrane envelope concentrically about the permeate collection tube such that the proximal edge of the membrane envelope is in a proximal position along the permeate collection tube.

4. The method of claim 3 wherein the support layer of the membrane sheet comprises a non-woven fabric comprising fibers orientated in the roll direction.

* * * * *